United States Patent Office 3,318,760
Patented May 9, 1967

3,318,760
LAMINATE ASSEMBLY WITH A MELAMINE-FORMALDEHYDE IMPREGNATED OVERLAY SHEET
Hermann V. Boenig, Muskegon, Mich., and James A. Waters, Jr., Cleveland, Ohio, assignors to Brookpark, Inc., Cleveland, Ohio, a corporation of Ohio
No Drawing. Filed May 21, 1963, Ser. No. 282,102
18 Claims. (Cl. 161—263)

This application is a continuation-in-part of United States applications, Ser. No. 45,805, filed July 28, 1960, Ser. No. 58,887, filed Sept. 28, 1960, and Ser. No. 110,649, filed May 17, 1961, all now abandoned.

This invention relates to a novel melamine-formaldehyde surface foil having improved properties, the process for preparing same and a novel intermediate resinous composition.

In its replacement of metal or wood, one of the most important properties of the molded or laminated melamine-formaldehyde resin is their superior surface scratch hardness relative to other synthetic resins. This quality has resulted in a large volume of these resins being used as surface compositions, such as, for example, desk tops, counter tops, furniture, and in the manufacture of dinnerware. In the manufacture of melamine dinnerware, to a resinous base plate is molded an overlay foil which is coated or impregnated with a standard melamine resin. Where the surface to be decorated, one of two practices may be followed. The underside of the overlay foil may be printed, or a separate printed foil may be placed on top of the base plate and then, on top of this, is placed the overlay foil. The overlay foil may be opaque or translucent depending upon the result desired. Obviously, in the case of a printed sheet, the resin-rich overlay foil must be transparent. Regarding laminates, such as counter tops, for example, the laminate comprises a core and surface assembly; the core usually consisting of 8 to 12 sheets of resin-impregnated kraft paper and the surface assembly usually consisting of a highly pigmented alpha pulp paper which is printed with an appropriate design, if desired, and contains a high hiding powder filler such as titanium dioxide or zinc oxide and an overlay foil.

While the melamine resins of the prior art are superior relative to other synthetic resins from the standpoint of surface scatch hardness, they are substantially inferior to materials such as china and glass in this respect. Measured by the Hoffman Scratch Test, using a Hoffman Hardness Tester, both hereinafter described, melamine resins of the prior art have a hardness value of 700–1000 grams, as opposed to china 2400 grams and Pyrex glass 2000–2200 grams. Thus, the presently available melamine resins have a substantially inferior surface scratch hardness as compared with china and glass. It is obvious that such a deficiency is a detriment to the broad acceptance of these resins in the above-noted and other fields of use where surface scratch hardness is a prime consideration.

An object of this invention is to provide a cured melamine-formaldehyde resin having a substantially improved surface scratch hardness. Other objects will become obvious to those skilled in the art as the description of this invention unfolds.

Broadly stated, we have discovered that a substantial increase in the surface scratch hardness of a cured melamine-formaldehyde resin may be achieved, without concomitant material crazing or cracking, provided that the melamine-formaldehyde resin (hereinafter referred to as "advanced melamine resin") introduced into the curing cycle possesses certain chemical and physical properties which are described in detail hereafter. These properties define a melamine resin in a state of advancement such that it is substantially water insoluble but yet sufficiently fusible to flow during the curing cycle.

More particularly, we have found that the melamine resin as it is subjected to curing must satisfy the following parameters in order that the resultant cured product possesses an increased surface scratch hardness and lack of material crazing, i.e., a mole ratio of formaldehyde/melamine of 1.5:1 to 3:1, preferably 2:1 to 2.2:1; a melting point (softening) of 185–265° C., preferred melting point range being 215–240° C.; and a percent extractable matter not in excess of 30%; both the melting point and extractability parameters as measured by procedures to be described hereafter.

The melting or softening point is determined by slowly elevating the temperature of sample of the melamine resin and note is made of the temperature at which the sample softens (melting point) prior to the sample advancing to a cured state. The extraction value is determined by a Soxhlet extraction of the melamine resin with methyl Cellosolve for 24 hours. Subsequently, the sample is dried and weighed.

A melamine resin sample of 15 grams and extracted with 150 mls. of solvent followed by drying the sample for three hours at 325° F. has given reproducible data.

Additionally, in the preferred form of the invention, curing agents, illustrated by those disclosed in our earlier filed applications referred to above, which applications are made a part of this disclosure have been found to enhance the increase in surface scratch hardness. Further investigation has revealed that in addition to the curing agents set forth in our earlier applications, other curing agents have been found that are suitable for bringing about an increase in surface scratch hardness when added to the advanced melamine resin of this invention. Generally, compounds that will ionize or release free radicals have been found suitable, with the further criteria that the activity of the particular curing agent with respect to the rate of cure of the melamine resin be adequate to effect the desired cure within conventional molding and laminating periods. Illustrative of the ionic type catalysts are the polyvalent metal fluorides, such as, for example, titanium tetrafluoride and zinc fluoride. Inorganic and organic peroxides, such as, for example, hydrogen peroxide and benzoyl peroxide, are compounds found suitable among the free radical groups of curing agents.

As mentioned earlier, in the fabrication of melamine moldings and laminates, it is the general practice to provide an overlay sheet or foil as a protective layer over the print or decorated sheet, which, in turn may be disposed on a substrata or core material, such as, for example, conventional phenolic or amino resin impregnated paper or fibrous material. Moreover, it is common practice to saturate or impregnate the overlay sheet with conventional melamine-formaldehyde resin.

According to this invention, the overlay sheet is fabricated in such manner that its surface has a coating of the advanced melamine resin disposed thereon and subsequently the overlay sheet and other components of the assembly (overlay—print sheet—core) are subjected to appropriate time, temperature and pressure conditions to thereby cure the assembly.

A suitable method for coating the overlay sheet is to form a dispersion of the advanced melamine resin in an appropriate medium and then to coat same on an overlay sheet previously impregnated with conventional melamine resin; and subsequently dry the coated sheet for a period of time and temperature adequate to remove the dispersion medium.

In a preferred form, the advanced melamine resin, curing agent and an organic polar solvent, such as, for example, low molecular weight alcohols or preferably a combination of low molecular weight alcohols and methyl Cellosolve, form a dispersion which is coated onto the overlay sheet. The dispersion is formed by first dry grinding the advanced melamine resin and curing agent in a ball mill to reduce the resin and agent to the desired particle size (about .08 mm.) and subsequently, to wet grind the previously ground advanced melamine resin and curing agent in the dispersing medium. A further aspect of the subject invention is the finding that if the advanced melamine resin, with or without a curing agent, and the dispersing medium (polar solvent) are ground in the presence of each other over the period of time usually needed to reduce the particle size of the melamine resin to the desired degree that the resultant coating on the overlay sheet requires a longer cure cycle to attain the scratch hardness. This phenomenon was particularly noted and found detrimental when the overlay sheet was used in dinnerware moldings, where the cure cycle is relatively brief, as compared with conventional laminating cycles of 20–30 minutes.

Organic non-polar solvents such as, benzene or xylene, may be used, however, the dispersions are generally not stable and rapid settlement occurs.

An alternative method of coating the overlay sheet is to apply a coating of melamine resin that is less advanced (generally water soluble) to a sheet impregnated with conventional melamine resin, and subsequently, advance the coated melamine resin, while in place on the sheet, to the aforedescribed stage of resin advancement. A further procedure involves taking a resin-free overlay sheet and impregnating same with a water soluble or dispersible melamine resin in such manner that there is a residence thickness of the unadvanced melamine resin disposed on the sheet and subsequently advancing the resin throughout the sheet.

In the case where the coating is made with a solid melamine resin, the curing agent and resin may be milled for a period of time sufficient to evenly distribute the curing agent throughout the resin, and then sift or screen the intimately mixed melamine resin-curing agent onto a sheet impregnated with a melamine or other conventional resin, which sheet has been partially dried and cured and then subsequently molding or laminating the foil.

A caveat in the coating process is that when formulating the coating using an ionic curing agent that the technique must avoid contacting the advanced melamine resin and ionic curing agent in the presence of an aqueous environment. This does not mean to say that a minor amount of water may not be present in any organic polar dispersant being employed. The precise amount of water that is tolerable can be determined for any given system by simple experimentation and determination of the shelf-life of the system without substantial further advancement of the resin.

If it is desired to use an aqueous solution of the melamine to impregnate or coat the foil, the aqueous solution of the resin may be first applied to the foil and the catalyst may then be sprayed or sifted onto the wet or a partially dried foil and then the foil dried before curing has advanced beyond the point where the resin is flowable when subjected to molding and laminating conditions.

Further, it may be desirable to insulate the catalyst from the resin composition until the mass is to be molded or laminated. Methods for insulating or rendering the catalyst non-reactive during storage and prior to the molding or laminating operation are well known in the art. For example, the catalyst may be coated with a low-melting wax that will flow and release the catalyst at molding and laminating temperatures. Zinc stearate is an example of material that may be used to coat solid catalysts.

Conventional molding and laminating conditions may be employed, i.e., in relatively short cycle molding operations such as in the manufacture of dinnerware, a molding cycle having a temperature of 300–325° F., pressure of 2000–3500 p.s.i., for a period of 1–2 minutes may be employed. We have found that by employing temperatures of 375–450° F. that additional improvement in scratch hardness results. However, as noted hereafter, using the catalysts of this invention, allows for the use of temperatures lower than those conventionally used. This factor is significant in that a melamine resin surface may be molded or laminated to a low-temperature curing resin, such as, urea-formaldehyde resins. In laminating, a temperature of 130–160° C., pressures of 250–1500 p.s.i. for a period of 15–25 minutes at the higher temperatures to about 60 minutes at the lower temperatures.

The catalyst may be present in an amount of 1 to 20%, but the preferred amount is on the order of 3–10%. The curing agent may comprise a sole or plurality of members from the ionic and free radical groups. For example, among the ionics, the combination of titanium tetrafluoride (2%) and zinc fluoride (3%) form a preferred curing agent system for the manufacture of dinnerware. Two significant factors in determining the concentration of catalyst to use are the particular catalyst used and the method of contracting or admixing the resin-catalyst. For example, in the case of the fluorides and chlorides, we have found that the higher the valence of the cation, the greater the effectiveness of a given weight of catalyst and consequently, a lesser concentration of catalyst need be employed. Furthermore, we have found that for a given cation the fluorides are more effective than the chlorides. Regarding the method of contacting or admixing the resin and catalyst, the more uniformly distributed the catalyst is in the resin the lesser the concentration of catalyst that is needed.

The moldings and laminating compositions of this invention may contain any of the conventional filler materials such as, for example, alpha cellulose, water glass, alumina hydrate, titanium oxide and zirconium oxide. As is well known in the art, the purpose of these fillers is to prevent cracking and crazing of the molded or laminated product during the shrinkage accompanying the cooling of the molded or laminated product as well as reducing cost, imparting whiteness and properties such as, impact strength and flexibility. Stabilizers, lubricants, plasticizers and pigments may likewise be added. However, the surface coating which imparts the increase in surface scratch hardness is a layer of critical thickness consisting essentially of cured "advanced melamine resin" and curing agent, if any. The presence of substantial amounts of fillers, pigments and plasticizers deleteriously affects the cured product. Particularly, we note that the melamine resin-plasticizer-pigment system such as described in U.S. Patent 2,739,081 to Wohnsiedler et al., produces a cured laminate with low gloss and an opacity that is entirely unsatisfactory for the production of decorative laminates wherein a melamine resin layer is superimposed on a print sheet. We have found that a melamine resin-plasticizer system as described in said patent, without pigment, likewise results in a product having comparatively low gloss and intolerable degree of opacity for a decorated laminate.

The thickness of the cured, substantially clear melamine resin atop the overlay sheet is critical. The thickness of the resin layer may be expressed in terms of weight of resin solids/sq. in. We have found that for the short curing cycles associated with compression molding (ex.—decorated dinnerware), a layer having a resin solids content of 10–45 milligrams/sq. inch is suitable; the preferred weight/area ratio being 20–30 milligrams/sq. inch. For the longer curing cycles used in making decorative laminates (ex.—table and counter tops), a resin layer of 10–25 milligrams/sq. inch is suitable, the preferred weight/area ratio is 15–20 milligrams/sq. inch.

In addition to the substantial improvement in surface scratch hardness, without material crazing or cracking, other physical properties of the molding and laminate are improved by the practice of this invention, viz. improvement in gloss and/or abrasion resistance as compared to conventional commercial melamine moldings and laminates. In the case of abrasion resistance, the products of this invention have shown a 25–30% improvement over prior commercial melamine resin products. Additionally, it has been noted that an improvement in stain resistance is realized.

Surface scratch hardness may be determined by the so-called "Hoffman Scratch Test" and is conveniently measured by use of the Hoffman Scratch Tester, manufactured by Gardner Laboratories, Bethesda, Md. This test measures the degree a surface will resist scratching or engraving by a circular edge drawn over the surface. The instrument is described in U.S. Patent No. 2,279,264. The instrument is essentially a beam upon which is placed at calibrated markings a known weight. The scale is graduated from 0 to 20 (each division equals 100 grams) permitting reading up to 2000 grams with one standard rider (weight) and up to 2400 grams with two standard riders. The weight reading taken when the first slight abrasion occurs is the scratch hardness value for the surface. In performing the test all four wheels of the instrument are placed on the surface and drawn in a straight line across the surface to be tested. The scratching edge follows, never precedes the carriage.

The method of determining the degree of abrasion comprises the following:

A disk, 4 inches in diameter, is molded in a disk mold. The disk is then perforated in the center, thoroughly cleaned, weighed, and clamped to the holder of the Taber Abrader, Model 174 (Taber Instrument Co., North Tonawanda, N.Y.) and the abrasion wheels placed on the surface of the molded disk. Then the molded disk is rotated for 1000 cycles. The abrasive wheels traverse a complete 360° cycle on the molding surface revealing abrasion resistance at all angles relative to the grain of the material. After 1000 cycles the molded disk is removed from the clamp, cleaned and re-weighed. The weight difference is then determined and this becomes the abrasion loss value. Throughout the application the value is stated in grams. In the case of determining the abrasion loss of a laminate a c.s. 17 wheel is used.

To determine the staining characteristics of the melamine, the following test is employed:

ACCELERATED COFFEE STAINING TEST

Cycle:
One-hour coffee boil—
1 lb. "drip ground" coffee ⎫
½ lb. sugar                ⎬ per 2½ gallons of water
½ lb. table cream          ⎭

6.4 oz. coffee ⎫
3.2 oz. sugar  ⎬ per 1 gallon (128 oz.) water
3.2 oz. cream  ⎭

3.2 oz. coffee ⎫
1.6 oz. sugar  ⎬ per 2 quarts water
1.6 oz. cream  ⎭

Place coffee in a cloth sack in boiling water. When coffee solution has reached standard strength (after approximately 10 minutes) remove coffee sack and add sugar, cream and test pieces. Do not allow test pieces to rest on container bottom. Boil for one hour and remove pieces. Prepare fresh coffee solution for each one-hour cycle.

Example I below typifies the preparation of a commercial molded melamine resin according to the prior art.

*Example I*

Melamine molding powder (Cymel 1077, an alpha-cellulose filled melamine-formaldehyde resin manufactured by American Cyanamid Company) was dielectrically heated to approximately 230° F. and placed in a mold, the molding temperature being 320° F. and the molding pressure 3000 p.s.i. After molding at this temperature and pressure for approximately 70 seconds, the mold was opened and the molded piece removed. The molded material had a scratch resistance of about 500 grams.

In the manufacture of decorated pieces, the above described process in Example I is modified to the extent that after the mold is opened, a conventional melamine resin-impregnated sheet of alpha-cellulose paper, the under side of which is printed with the desired decoration, is placed atop the molded piece and the mold reclosed to allow the molded piece and surface sheet to be heated at a temperature of 320° F. and 3000 p.s.i. for an additional 60 seconds. The molded piece made in the above manner had the following surface properties:

Scratch hardness: 900.
Abrasion after 1000 cycles: .021 gm.
Staining: dark yellow-brown.

Example II sets forth a typical manufacture of a laminated melamine product according to the prior art.

*Example II*

The laminate is composed of a core and surface assembly. The core usually consists of 8 to 12 sheets of kraft paper impregnated with phenol-formaldehyde resin. The surface assembly usually consists of a highly pigmented alpha pulp paper which is printed with an appropriate design, if desired, and contains a high-hiding powder filler, such as titanium dioxide or zinc oxide and a protective overlay foil. The surface assembly was then impregnated with a melamine resin. The assembly is placed between two caul plates and thereafter placed in the laminating press. Temperatures of 130–160° C., pressures of 250–1500 p.s.i. for a period of 15–25 minutes including cooling time are usually employed in laminating. Surface properties of laminates made in this manner were:

Scratch hardness: 850.
Abrasion after 1000 cycles: .022 gm.
Staining: dark yellow.

*Example III*

3 grams of titanium tetrafluoride, 1 gram zinc fluoride, 36 grams of advanced melamine-formaldehyde resin and 60 grams of ethanol are mixed with agitation for ½ hour. The resulting dispersion is coated onto one surface of a 3.5 mil alpha-cellulose paper, by pouring the dispersion over the foil and letting it dry for 10 minutes at room temperature and 10 minutes at 180° F. The treated foil is then placed atop a laminate core described in Example II and subsequently placed in a laminating press and molded in the manner described in Example II for 10 minutes at 320° F. The resulting product had the following properties:

Scratch hardness: 1800.
Abrasion after 1000 cycles: .012 gm.
Staining: slight yellow.

*Example IV*

4 grams of titanium tetrafluoride, 46 grams of advanced melamine resin were dry ground in a ball mill for three hours. Subsequently, 60 grams of ethanol was added and the mass further ground for an additional two hours to effect a dispersion of the resin and curing agent in ethanol. The resulting dispersion was coated onto a melamine-formaldehyde impregnated paper, as described in Example I, and molded to a base plate comprising a cured conventional melamine molding powder, producing a product having the following properties:

Scratch hardness: 2100.
Abrasion after 1000 cycles: .010 gm.
Staining: very slight yellow.

*Example V*

An advanced melamine resin (75 parts) and a curing agent (3 parts zinc fluoride and 2 parts titanium tetrafluoride) were dry ground in a ball mill for three hours.

Then, added to the resin-curing agent a liquid consisting of 25.6 parts butyl alcohol and 13.9 parts of methyl Cellosolve and wet ground in the ball mill for two hours. Material collected from the ball mill and introduced into an agitated vessel containing 20 parts of a water soluble melamine resin (Cymel 430, American Cyanamid Co.) dissolved in approximately 25 parts of methyl Cellosolve to thereby form a dispersion of resin in liquid. The dispersion was then coated onto an alpha-cellulose overlay sheet and molded according to the conditions described in Example I. The product had the following properties:

Scratch hardness: 2000.
Abrasion after 1000 cycles: .009 gm.
Staining: very slight yellow.

It should be noted that a minor amount of water-soluble molding or laminating resin may be added to the "advanced melamine resin." It is particularly useful in short cycle, relatively low pressure molding operations to impart the desired degree of flow to the resin coating the overlay sheet.

Table I sets forth data showing an increase in surface scratch hardness using the advanced melamine resin without catalyst. The advanced resin is one having a 1:2 melamine/formaldehyde ratio, and extractabiliy value under 30% and the indicated melting point range.

TABLE I

| Resin Sample | Cure Cycle | Hoffman Hardness |
| --- | --- | --- |
| (a) 230–240° C | 10'/280° | 1,500 |
|  | 30'/280° | 2,100 |
| (b) 255–265° C | 10'/280° | 1,500 |
|  | 30'/280° | 2,200 |
| (c) 215–225° C.* | 10'/280° | 1,700 |
|  | 30'/280° | 2,300 |
| (d) 230–240° C.* | 10'/280° | 1,700 |
|  | 30'/280° | 2,200 |

*Cured in presence of 1% zinc stearate-mold lubricant.

In the preparation of the coated overlays set forth in Table I, the dispersion of advanced resin was formed by wet grinding for 19 hours in a 50/30/20 methyl Cellosolve/n-butanol/anhydrous Solox liquid at 45% solids content.

Finally, the subject invention provides a method for preparing moldings and laminates of melamine and low temperature curing resins. In the past, the temperature differential for commercial curing of low tempertaure curing resins, such as, urea formaldehyde and high temperature curing resins, such as, melamine resins has prevented their being combined in a composite molding or laminate. We have found that by employing the techniques of this invention that melamine resins may be cured at temperatures substantially lower than conventional 300–350° F. and still produce a satisfactory surface hardness. The catalyst concentration may range from .05 to 20.0% by weight of the melamine resin. The preferred range is 1 to 15%. For example, polyester and urea-formaldehyde resins are normally cured at 250–280° F. We have been able to mold or laminate a melamine resin surface to the low-temperature curing resins at these lower temperatures. The following example illustrates the low-temperature curing of melamine resins to form a hardened surface for a low temperature curing resin.

*Example VI*

To a 150 g. of a glass mat (Famco, Inc., Louisville, Ky.) are added 300 g. of a polyester resin, P444A, from Rohm & Haas, which has been catalyzed with 1% methyl-ethyl ketone peroxide and .25% cobalt naphthenate. On top of this layer is placed a 10-mil paper containing about 10% $TiO_2$ which has been saturated with 40% of 405 melamine resin (American Cyanamid) and dried. After that the top portion has been coated with a coating composition consisting of 70% ethanol, 27% advanced melamine resin, 2% $TiF_4$ and 1% zinc fluoride and dried. The melamine resin and curing agents were dry ground prior to forming the dispersion. The other side of this foil was coated with a butylated melamine formaldehyde resin.

The above foil was placed on top of the wet polyester glass lay-up with the butylated melamine coated foil side abutting the polyester. A foil treated in the same manner was placed on the bottom of the wet lay-up butylated melamine abutting the polyester resin. This assembly was then allowed to stand at room temperature until the polyester was completely pre-gelled. This took approximately 40–60 minutes. After that, the pre-gelled panel was placed in the press and molded at 250 p.s.i. and 250° F. for 4 minutes. The resulting panel has a scratch hardness of 1500 and an abrasion resistance of .016 gm.

In the earlier applications of which this application is a continuation-in-part, surface hardness was stated in terms of "Diamond Scratch Hardness" as determined by the test procedure and apparatus described in said earlier applications. In the present application, the surface hardness has been determined by the Hoffman Scratch Test. In the table below comparable values for each of the tests are set forth in increments of 50 for the "Diamond Scratch Test."

TABLE II

| Diamond scratch hadrness | Hoffman scratch hardness |
| --- | --- |
| 50 | 100 |
| 100 | 200 |
| 150 | 300 |
| 200 | 400 |
| 250 | 600 |
| 300 | 720 |
| 350 | 900 |
| 400 | 1,130 |
| 450 | 1,420 |
| 500 | 1,710 |
| 550 | 2,000 |
| 600 | 2,200 |
| 650 | 2,400 |

What is claimed is:

1. In a laminate assembly comprising a core material impregnated with a thermosetting resin and an overlay sheet, the improvement comprising a resin-impregnated overlay sheet having coated thereon an advanced melamine resin consisting essentially of a substantially water-insoluble melamine resin having a mole ratio of formaldehyde/melamine of 1.5:1 to 3:1, a melting point of 185–265° C., a percent extractable matter less than 30% by weight, said overlay sheet being particularly adapted to produce a cured product having a resistance to scratching and crazing.

2. The article of claim 1, wherein the advanced melamine resin has a mole ratio of 2.0:1 to 2.2:1 and a melting point of 215–240° C.

3. The article of claim 2, wherein the advanced melamine resin has been cured.

4. The article of claim 1, wherein there is present in the overlay coating a melamine-formaldehyde curing agent selected from the group consisting of ionic and free radical compounds.

5. The article of claim 4, wherein the curing agent comprises 3 percent by weight of total solids zinc fluoride and 2 percent by weight of total solids titanium tetrafluoride.

6. The article of claim 5, wherein the advanced melamine resin has been cured.

7. The article of claim 4, wherein the advanced melamine resin has been cured.

8. The article of claim 1, wherein there is present in the overlay coating a melamine-formaldehyde curing agent consisting of titanium tetrafluoride and zinc fluoride.

9. The article of claim 8, wherein the advanced melamine resin has been cured.

10. The article of claim 1, suitable for the cycles associated with decorative laminates, wherein the advanced melamine resin is present as a coating on the overlay sheet in an amount between 10–30 milligrams/sq. inch.

11. The article of claim 10, wherein the advanced melamine resin has been cured.

12. The article of claim 1, suitable for the cycles associated with decorative laminates, wherein the amount of advanced melamine resin coating the surface of the overlay foil is between 15–20 milligrams/sq. inch.

13. The article of claim 12, wherein the advanced melamine resin has been cured.

14. The article of claim 1, wherein the advanced melamine resin has been cured.

15. The article of claim 1, suitable for compression molding, wherein the advanced melamine resin is present as a coating on the overlay sheet in an amount between 10–45 milligrams/sq. inch.

16. The article of claim 15, wherein the advanced melamine resin has been cured.

17. The article of claim 1, suitable for compression molding, wherein the amount of advanced melamine resin coating the surface of the overlay is between 20–30 milligrams/sq. inch.

18. The article of claim 17, wherein the advanced melamine resin has been cured.

References Cited by the Examiner

UNITED STATES PATENTS

| | | | |
|---|---|---|---|
| 2,528,359 | 10/1950 | Greenlee | 260—67.6 X |
| 2,802,804 | 8/1957 | Reid et al. | 260—33.2 |
| 2,957,843 | 10/1960 | Anderson et al. | 260—33.2 |
| 3,028,385 | 4/1962 | Batzer et al. | 260—67.6 X |
| 3,046,160 | 7/1962 | Dengler | 117—55 |
| 3,083,119 | 3/1963 | Flowers et al. | 117—55 |
| 3,131,116 | 4/1964 | Pounds | 161—258 |

FOREIGN PATENTS 657,551 12/1947 Great Britain.

OTHER REFERENCES

Plastics (London), "Melamine Plastics," April 1945, pp. 159–173.

Plastics (London), "Laminating With Melamine Resins," December 1946, pp. 46, 48, 49, 94, 95.

WILLIAM D. MARTIN, *Primary Examiner.*

H. W. MYLIUS, R. HUSACK, *Assistant Examiners.*